United States Patent

[11] 3,584,510

| [72] | Inventor | James W. Harris<br>Speedway, Ind. |
|---|---|---|
| [21] | Appl. No. | 649,618 |
| [22] | Filed | June 28, 1967 |
| [45] | Patented | June 15, 1971 |
| [73] | Assignee | General Motor Corporation<br>Detroit, Mich. |

[54] THERMOCOUPLE LEAD ATTACHMENT
4 Claims, 6 Drawing Figs.

[52] U.S. Cl................................................. 73/359,
73/341, 136/231, 136/235, 339/263
[51] Int. Cl..................................................... G01k 7/02
[50] Field of Search....................................... 73/359,
341; 339/153, 258, 259, 263; 136/235

[56] References Cited
UNITED STATES PATENTS

| 1,836,293 | 12/1931 | Strahan | 339/199(UX) |
| 2,875,613 | 3/1959 | Neal | 73/341 |
| 2,926,209 | 2/1960 | Cantlin et al. | 73/341 X |
| 2,999,121 | 9/1961 | Mead | 73/359 X |
| 3,053,922 | 9/1962 | Schunke | 73/359 X |

FOREIGN PATENTS

| 1,135,895 | | France | 73/359 |
| 1,234,270 | | France | 339/259 |

Primary Examiner—Louis R. Prince
Assistant Examiner—Frederick Shoon
Attorneys—Jean R. Carpenter and Paul Fitzpatrick ABSTRACT: A push-on pull-off readily attachable and removable connection between thermocouples and the leads which run from the thermocouples to instruments which respond to the temperature sensed. The terminal studs of the thermocouples, which are of Alumel and Chromel, are threaded. Each lead is bolted to an adapter of Alumel or Chromel which defines a socket for the terminal stud bounded by four fingers separated by saw cuts. A contracting ring spring is disposed around the adapter so as to cause the fingers to compressively engage the terminal stud.

PATENTED JUN 15 1971 3,584,510
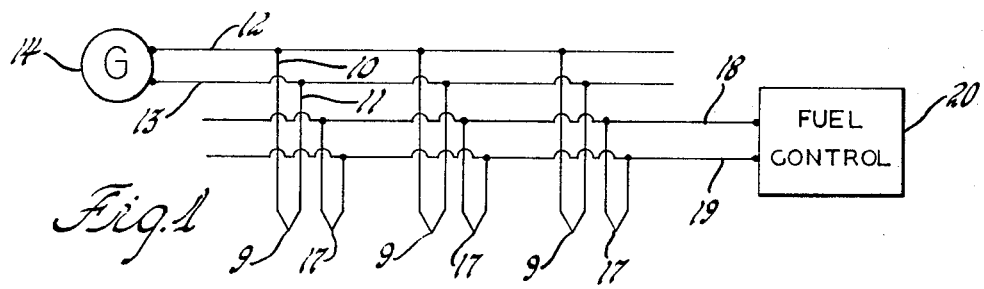
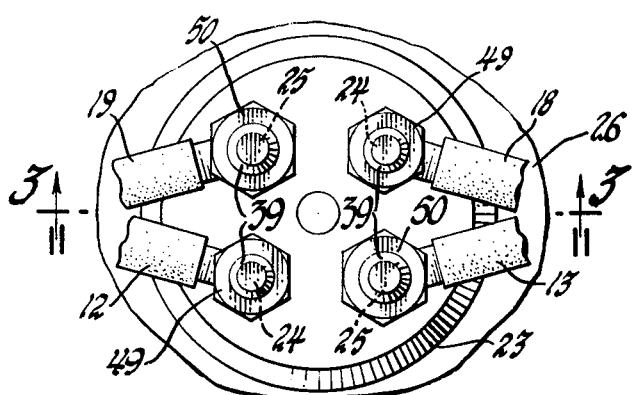
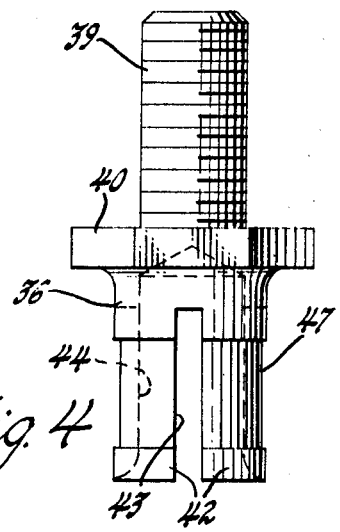
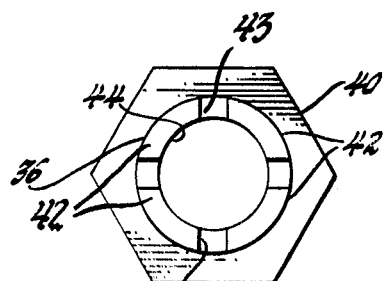
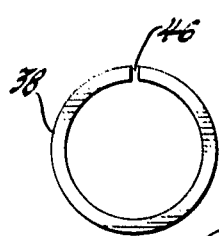
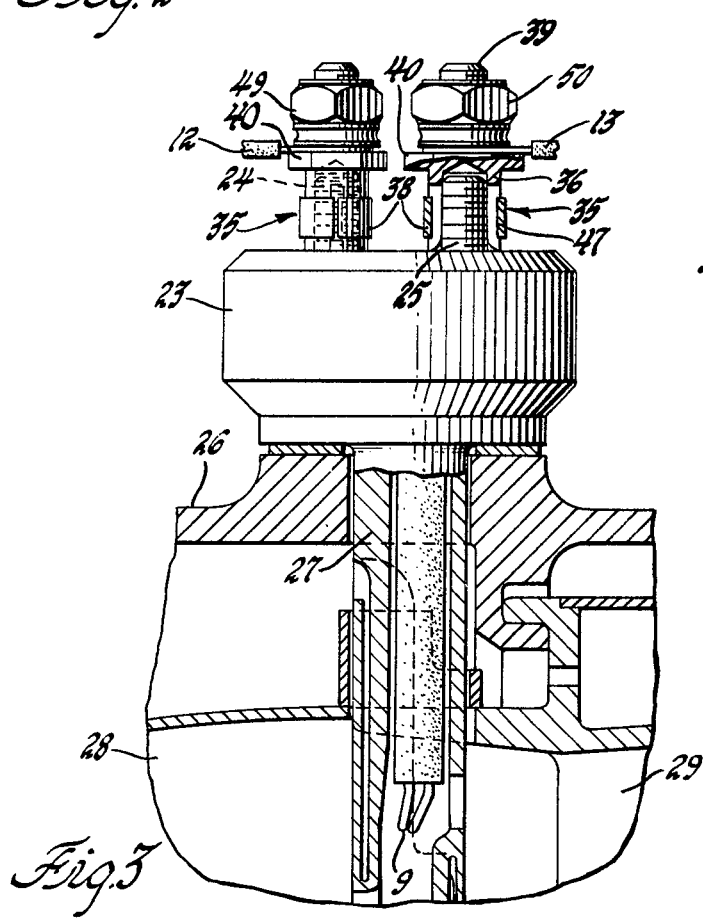
INVENTOR.
James W. Harris
BY
Paul Fitzpatrick
ATTORNEY

THERMOCOUPLE LEAD ATTACHMENT

"The invention herein described was made in the course of work under a contract or subcontract thereunder with the Department of Defense."

My invention relates to wire connectors, and particularly to a lead attachment intended for use with thermocouples such as are used on gas turbine engines. It has been common practice to provide such thermocouples with threaded terminal studs to provide such thermocouples with threaded terminal studs to which the leads of the engine wiring harness are fixed by nuts threaded onto the studs. According to the preferred embodiment of my invention, a push-on pull-off adapter is used to connect the harness to the terminal stud, this adapter being compressed by a ring spring so that it frictionally engages the threaded stud of the thermocouple. The adapter and leads are made of the same material as the wires of the thermocouple junction and the spring is of material which retains its elastic properties at high temperature. The harness may be attached to the adapter by any suitable means, such as a threaded stud and nut, but this attachment need not be disturbed when the thermocouples are tested or replaced.

The significance of the invention may be appreciated when it is considered that a well-known gas turbine aircraft engine, the Allison Model 501 engine, has 18 dual thermocouples to measure turbine inlet temperature. Thus, there are 72 wire terminals which must be disconnected and reconnected whenever the thermocouples are tested or a set of thermocouples in replaced. Also, since the output of the thermocouple is very small, being something on the order of 20 millivolts, and about 3 or 4 milliamperes when connected to a galvanometer, it is highly important that the contact the of very low and consistent resistance; also, that the connection of the harness to the thermocouple is reliable, since failure of the connections may jeopardize the life of the engine. The principal objects of may invention are to provide a superior easily attached and detached wiring connection, one which has low and consistent resistance, and particularly one suited to the requirements of thermocouple circuits.

The nature of my invention and the advantages thereof will be clear to those skilled in the art from the succeeding detailed description of the preferred embodiment of the invention and the accompanying drawings thereof.

FIG. 1 is a wiring diagram of a gas turbine thermocouple installation.

FIG. 2 is a plan view of a thermocouple head.

FIG. 3 is a view of a thermocouple installed in a gas turbine engine, with parts cut away and in section on the plane indicated by the line 3–3 in FIG. 2.

FIg. 4 is an elevation of an adapter.

FIG. 5 is a bottom view of the same.

FIG. 6 is a view of a ring spring.

Referring first to FIG. 1, the temperature measuring and control system of a gas turbine engine may include a number of thermocouple junctions 9 of a first set connected by wires 10 and 11 to common leads 12 and 13, which are in turn connected to a galvanometer or other suitable instrument 14 calibrated to indicate the temperature sensed by the thermocouples. A second set of thermocouple junctions 17 are connected through common leads 18 and 1 to a fuel control device 20 which may serve to control or limit the fuel supplied to the engine as a function of the temperature sensed. While only three thermocouples of each set are illustrated, the number may be much greater. As a practical matter, it is desirable to combine thermocouple junctions of the two sets in duplex thermocouples. Such a thermocouple is illustrated in FIGS. 2 and 3, the particular thermocouple shown being the subject matter of an application for patent of Jay D. Meader for Cooled Thermocouple Ser. No. 639,464 filed on May 18, 1967, now Pat. No. 3,451,268, issued June 24, 1969, of common ownership with this application.

The details of the thermocouple are immaterial to my invention and will be mentioned only briefly. The thermocouple includes a head 23 on which are mounted two Alumel terminal studs 24 and two Chromel terminal studs 25. The head is mounted on the outer wall 26 of a gas turbine engine and a probe 27 extends from the head into the hot gas duct 28 which supplies the turbine through nozzle 29. A thermocouple junction 9 is shown in FIG. 3 and a junction 17 is concealed behind junction 9. The hot motive fluid flows through the body of the thermocouple past the junctions 9 and 17, generating a small electromotive force indicative of the temperature. As shown in FIG. 2, the two Chromel terminal studs 25 are connected to leads 13 and 19, respectively, and the Alumel studs 24 are connected to leads 12 and 18, respectively, these being part of the thermocouple wiring harness. It will be noted that terminals 24 and 25 are of different size to prevent reverse connection of the leads.

The wiring harness or leads are connected to the terminal stud by adapters 35 shown most clearly in FIGS. 3, 4, 5 and 6. Each adapter 35 comprises an adapter body 35 and and a ring spring 38. The adapter body is a unitary piece of Alumel or Chromel, (or whatever alloy is used for the corresponding terminal stud) having a threaded stud portion 39, a hexagonal portion 40 to receive a wrench, and four spring fingers 42 separated by slots or saw cuts 43. The fingers define a cylindrical socket 44 dimensioned to receive the terminal stud 24 or 25 as the case may be. The threaded stud portion 39 is preferably of the same diameter and thread as the terminal to which the adapter is to be applied. The spring 38 is a simple ring of flat strip stock with a narrow gap 46. For the intended use the spring is made of an alloy which retains its elastic properties at high temperatures such as René 41, a commercially available material, since the gas turbine environment is quite hot. The spring 38 is assembled onto the adapter body over the fingers 42 and lodged in a very slight undercut 47 in the cylindrical outer surface of the fingers so that it will not slip off. Spring 38 preferably provides about 15 to 20 pounds of pressure on the fingers to cause them to bear firmly against the threaded terminal stud.

After the spring is applied to the adapter body, the lead is semipermanently attached to the adapter by tightening a nut 49 and 50 onto the threaded portion 39 of the adapter. Then, the adapter is slipped onto the appropriate terminal stud of the thermocouple to complete the connection. Since the threads on the terminal present a generally sharp edge of rather limited area compared to the overall superficial area of the stud and adapter, the unit contact pressure is relatively high. Also, as the adapter is slid onto the terminal stud, there is a wiping action to clear way any oxides or other contamination which might reduce the conductivity of the connection. In the preferred embodiment, a force of perhaps 10 pounds is required to attach or remove the adapters and the connection is proof against any ordinary disturbing forces or vibration.

So far as the operability of the invention is concerned, the terminals 24 and 25 could be simply scored circumferentially rather than threaded, but there would be no advantage to this. Also, it may be noted that there is nothing critical about the mode of attachment of the leads to the adapter. In the particular adapter illustrated, the stud portion 39 is threaded so that the nuts 49 and 50 ordinarily applied to the thermocouple may be used to attach the wire or lead to the adapter.

It is obvious that the adapter could be internally threaded for application to a smooth terminal stud, but this is not considered as desirable as the embodiment illustrated, since it requires thermocouples with nonstandard terminals.

It should be clear to those skilled in the art that the connector arrangement and the thermocouple harness arrangement described herein are particularly advantageous in multiple thermocouple installations and are calculated to save a great deal of time and effort, particularly where thermocouples are in relatively inaccessible locations in engine in service.

The detailed description of the preferred embodiment of the invention for the purpose of explaining the principles

I claim:

1. An electrical system comprising a transducer effective to generate a current of the order of magnitude of a few milliamperes at a potential of the order of magnitude of a few millivolts, an instrument responsive to the output of the transducer and wiring interconnecting the transducer and instrument, the wiring including electrical leads and a readily detachable connector for connecting the transducer to each lead extending from the transducer, the connector comprising, in combination, a terminal stud on the transducer having a threaded outer surface of generally cylindrical form, an adapter body having a boss split axially of the boss into parallel fingers and defining a socket bounded by the fingers having an interior surface adapted to receive and frictionally fit the terminal stud, a spring extending around the exterior of the boss engaging the fingers to bias them into compressive engagement with the terminal stud, and means including a portion of the adapter having threads of the same dimensions as those on the terminal stud fixing the lead to the adapter, so that the transducer may be connected and disconnected by sliding the adapters onto and off the terminal studs, and a low-resistance contact between the terminal stud and adapter is ensured by the wiping action of the parts in making the connection and the small area of relatively high unit bearing pressure at which the adapter and terminal stud are in contact.

2. A system as defined in claim 1 in which the transducer is a thermocouple.

3. A system as defined in claim 2 in which each adapter is of the same composition as the corresponding terminal stud.

4. A system as defined in claim 3 in which the spring is of a material having good elastic properties at high temperatures.